Oct. 21, 1947.  A. E. ARMSTRONG  2,429,254
TEMPERATURE CONTROL FOR SPACE HEATING SYSTEMS
Filed Nov. 10, 1943  3 Sheets-Sheet 1

INVENTOR.
Adam E. Armstrong
BY
Earl F. Chappell
ATTORNEYS.

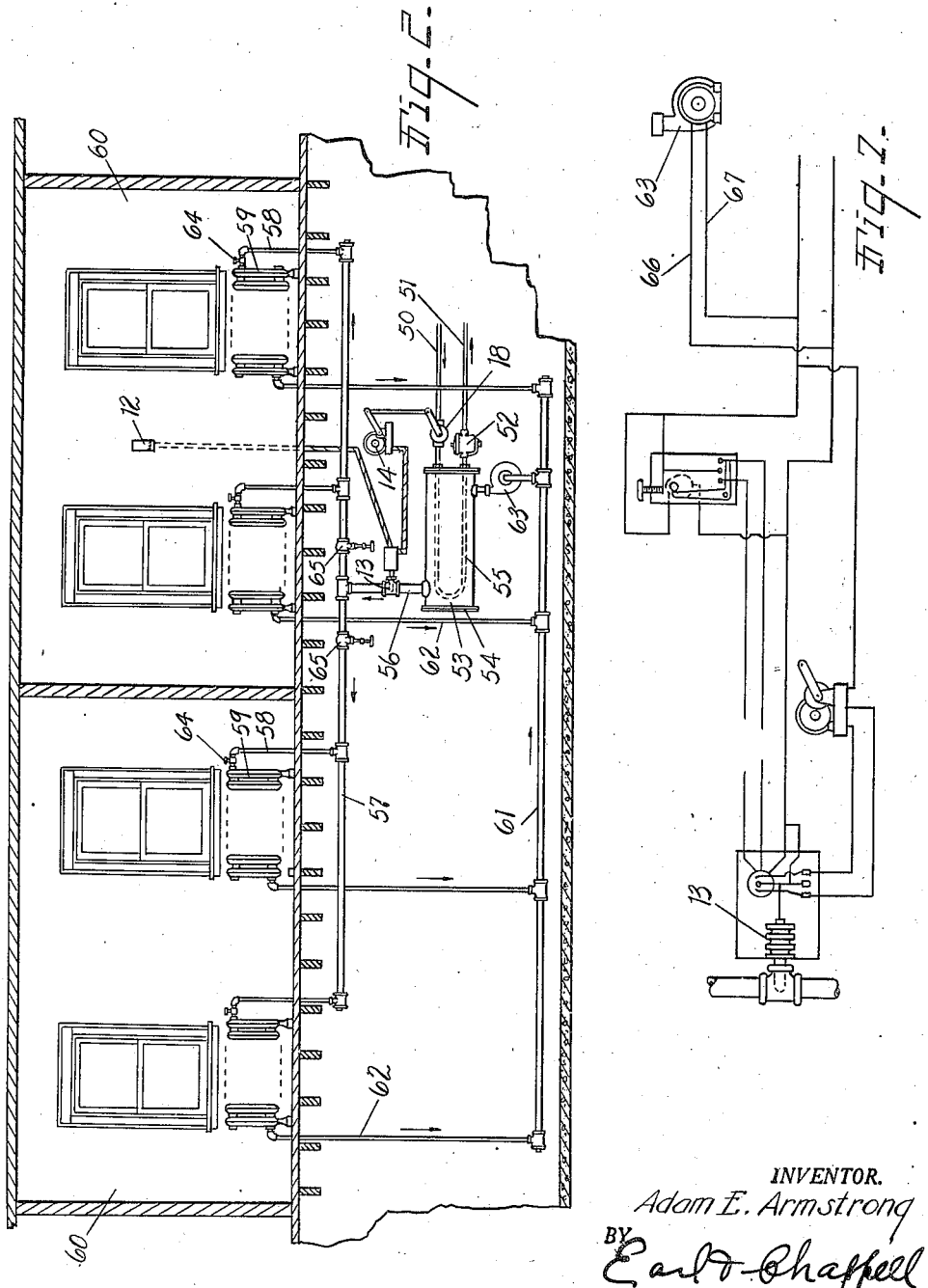

Oct. 21, 1947. A. E. ARMSTRONG 2,429,254
TEMPERATURE CONTROL FOR SPACE HEATING SYSTEMS
Filed Nov. 10, 1943 3 Sheets-Sheet 3
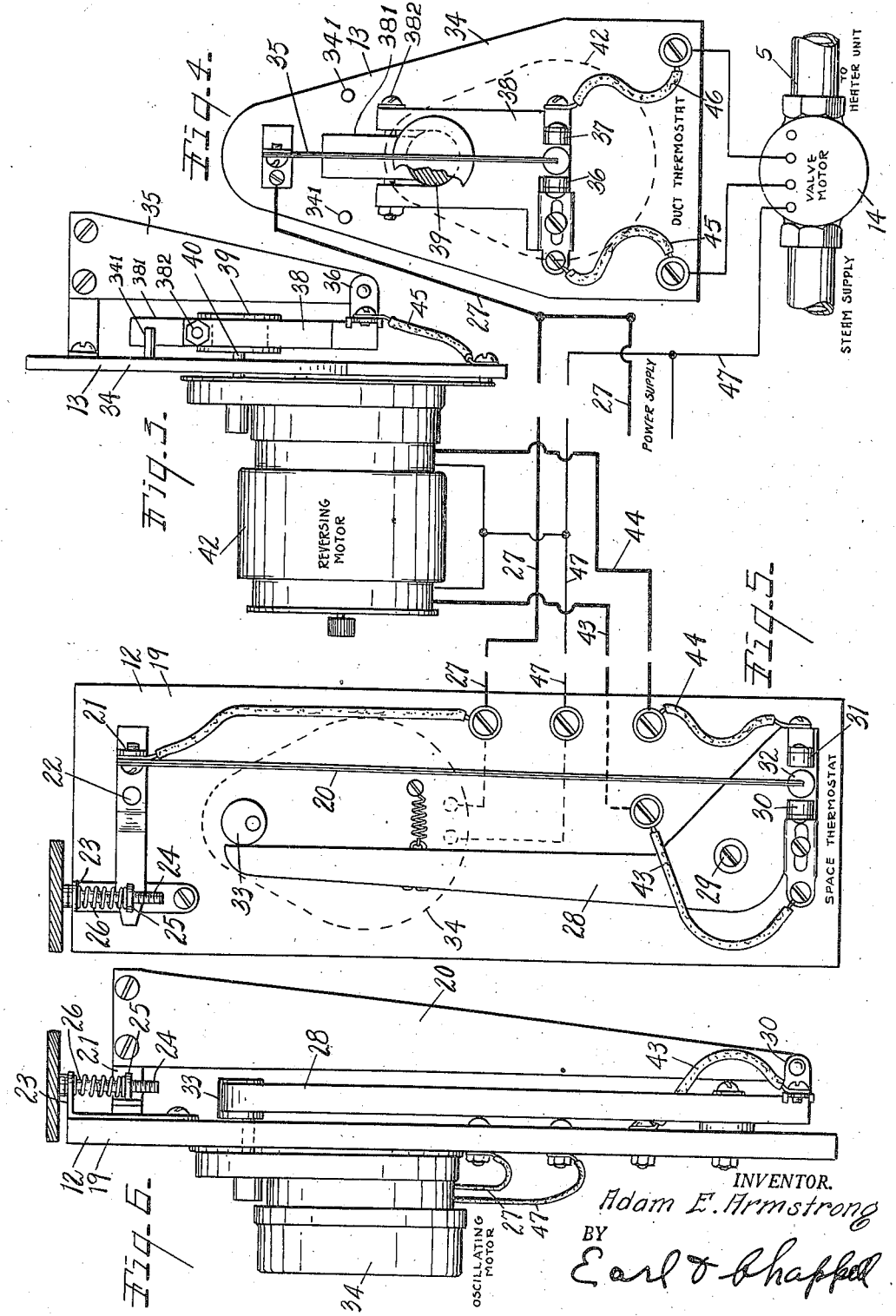

Patented Oct. 21, 1947

2,429,254

UNITED STATES PATENT OFFICE 2,429,254

TEMPERATURE CONTROL FOR SPACE HEATING SYSTEMS

Adam E. Armstrong, Three Rivers, Mich., assignor to Armstrong Machine Works, Three Rivers, Mich.

Application November 10, 1943, Serial No. 509,656

8 Claims. (Cl. 236—37)

This invention relates to improvements in temperature control for space heating systems.

The main objects of this invention are:

First, to provide a temperature control for space heating systems in which the temperature of the heated space may be accurately controlled within a very small range.

Second, to provide a space heating temperature control system in which uniform temperatures may be maintained in a plurality of spaces heated by an individual heat exchange unit and all connected to a common source of circulating heating medium.

Third, to provide a heating system control which results in an economical use of the heating medium.

Fourth, to provide a heating system control having these advantages which is automatic in its operation and requires little if any attention after being properly installed and adjusted.

Further objects pertaining to details and economies of the invention will definitely appear from the description to follow. The invention is defined in the claims.

A structure which embodies the features of the invention is clearly illustrated in the accompanying drawing, in which:

Fig. 2 is a fragmentary side elevation with parts largely conventionalized of a heating system embodying the invention as adapted for a hot water system.

Fig. 3 is a fragmentary view showing the space thermostat in side elevation, the electrical connections for these thermostats being illustrated.

Fig. 4 is a front elevation of the duct thermostat showing its operative relation to the valve, motor parts being conventionalized and partially broken away.

Fig. 5 is an elevation view of the room thermostat viewed from the right of Fig. 6.

Fig. 6 is a side elevation looking from the left of Fig. 5.

Fig. 7 is a conventionalized diagrammatic view illustrating the wiring and operating relationship for certain of the parts in the embodiment shown in Fig. 2.

Figure 1:
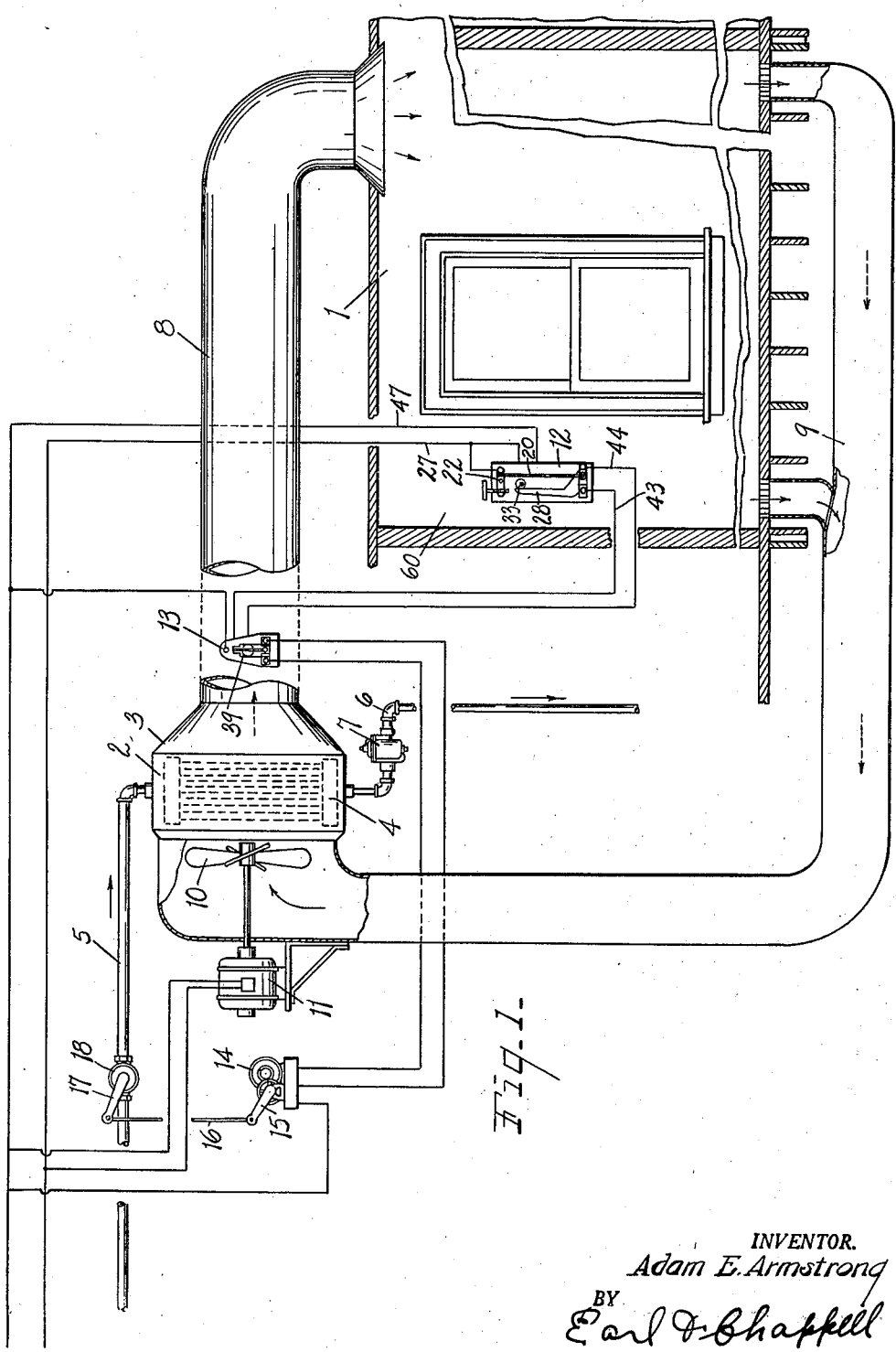
Fig. 1 is a fragmentary view largely conventionalized of a space heating system embodying the features of this invention as adapted to a hot air system.

In the embodiment of the invention shown in Fig. 1, I represents a room or space to be heated and 2 a heat exchange unit comprising a casing 3 having a radiator 4 arranged therein, the radiator being shown by dotted lines. The radiator is provided with a supply pipe 5 for steam and a condensate discharge 6 having a trap 7 therein. The heat exchange unit casing is connected by the duct 8 to deliver to the space 1. The return duct 9 is connected to the heat exchange unit 2. The heated air is preferably forcibly circulated by means of the fan or blower 10 driven from the electric motor 11.

A room thermostat designated generally by the numeral 12 is suitably positioned in the space to be heated. The duct thermostat designated generally by the numeral 13 is positioned in the duct 8, preferably quite close to the heat exchange unit. The space thermostat 12 is connected to the duct thermostat for controlling the same, as will be hereafter described. The duct thermostat controls the motor 14 which drives the arm 15 connected by the link 16 to the arm 17 on the valve 18 which controls the delivery of the steam to the heat exchange unit. The space and duct thermostats are illustrated with such detail as seems necessary to an understanding of the present invention in Figs. 3, 4 and 5.

The space thermostat is preferably that illustrated in the application for patent of Adam E Armstrong and William A. Dehn, filed October 27, 1943, Serial No. 507,776. It comprises a plate-like base member 19 having a blade-like bimetallic thermal element 20 mounted on the arm 21 carried by the pivoted support 22. This support is provided with an ear 23 engaged by the adjusting screw 24 threaded through an ear 25 on the support 22. The coiled spring 26 holds the member in its adjusted position. This thermal element is connected to a source of current 27. This provides means for manual adjustment of the thermostat to the desired temperature.

The lever-like contact supporting member 28 is pivoted at 29, the contacts 30 and 31 being mounted thereon in operative relation to the contact 32 of the thermal element. The contact 30 is adjustably supported on the arm 28. This arm 28 is oscillated by means of the cam 33 driven from the motor 34, which results in periodic oscillation or movement of the contacts 30 and 31 to and from the normal temperature adjusted position of the thermal element. A synchronous type of motor is preferably used.

The duct thermostat 13 in the embodiment illustrated comprises the base member 34 on which the bimetallic thermal element 35 is mounted. The contacts 36 and 37 of this duct thermostat are carried by an oscillatingly mounted member 38 frictionally actuated from the rotary drum or bearing 39, the shaft 40 of which is driven through a suitable train of gears, not shown, from the reversing motor 42. Oscillation of the member 38 by frictional contact with its rotary supporting drum 39 is limited by the spaced stops 341 engageable by block 381 secured in the upper forked end of the oscillating member 38 by means of bolt 382. By tightening and loosening the nut of the bolt 382, the frictional contact between the member 38 and drum 39 may be adjusted as will be apparent by reference to Fig. 4. The contact member 36 is adjustably mounted on this support 38.

The reversing motor is connected by the electrical conductors 43 and 44 to the contacts 30 and 31, respectively of the space thermostat so that the reversing motor is controlled by the space thermostat. The duct thermostat contacts 36 and 37 are connected by the electrical connections 45 and 46 to the valve motor 14, which is also connected to the source line 27, as is the thermal element of the duct thermostat. The second source line is shown at 47 and this is also connected to the reversing motor.

With the parts thus arranged the space thermostat controls the duct thermostat and the duct thermostat controls the opening and closing of the heating medium supply valve, or, more specifically, its motor. As stated, the space thermostat contacts are mounted so that they are alternately moved to and from the normal position of the coacting thermal element. This results in periodic interruption of the current flowing from the contacts to the reversing motor with the result or advantage that very accurate control of the duct thermostat is provided, the object being to control the temperature in the heated space with very little variation from the predetermined desired degree. The reversing motor, according to the direction in which it is driven, shifts the support 38 from a central normal position to bring one or the other of the contacts 36 and 37 as may be required for the desired result into engagement with the electrical contact at the lower end of the thermal responsive element 35 to actuate the motor 14 for opening or closing the valve 18 as may be required. When the reversing motor 42 is de-energized the frictional drive connection between the rotary bearing 39 and the oscillating contact support 38 permits said support to be moved by gravity back to said central normal position. The duct thermostat may then control the temperature of the fluid flowing through the duct independently of the control of the space thermostat, until the reversing motor is again actuated by the space thermostat.

By positioning the duct thermostat close to the heat exchange unit, it is directly subject to the heated fluid discharged therefrom. If that fluid is below a predetermined degree the motor 14 is caused to open the valve 18, and if it is above the predetermined degree it is caused to close it. However, this duct thermostat is controlled from the space thermostat, the temperature of which it is desired to control.

My improved apparatus results in a very accurate control of the temperature in the controlled space with a resulting saving in fuel as well as being desirable from the standpoint of comfort. The parts are shown mainly in conventional form in Fig. 1, but it is believed that adaptation to heating systems of the hot air type generally will be readily understood. While I preferably place the duct thermostat within the duct, it may be positioned otherwise if positioned so that it is sensitively associated with the heating medium conveyed by the duct.

In Fig. 2 I illustrate an embodiment of the invention as adapted in a heating system employing steam. In this embodiment 50 represents the steam supply pipe and 51 the return or condensate pipe or conduit which is provided with a steam trap 52. The heat exchange unit 53 comprises the casing 54 having the coil 55 therein. The medium heated in this heat exchange unit is water, the heat exchange unit being connected by the duct 56 to the header 57 which is connected by branches 58 to individual heat exchange units or radiators 59 within the rooms or spaces 60 to be heated. The return header 61 is connected by the return passages 62 to the heat exchangers or radiators 59. A centrifugal pump 63 connects the return header to the heat exchange unit 53 so that water is continuously circulated through the several radiators or heat exchangers that may be connected to the supply or delivery header. The amount delivered to any particular heat exchanger 59 is regulated by the heat exchanger inlet valve 64.

It will be noted that the delivery header extends both ways from the delivery conduit 56 of the heat exchange unit and these branches are provided with control valves 65 which enable control of the heating medium to meet various conditions in a building having a plurality of rooms, or control according to exposures and other conditions. The space thermostat 12 is suitably positioned and this controls the duct thermostat 13 placed in the outlet duct 56 of the heat exchanger. This in turn controls the motor 14 which is operatively connected to supply control valve 18 as in the embodiment described for hot air heating systems.

In Fig. 7 I show a wiring diagram, the parts being connected as described, with the exception that the pump 63 is connected to the power line by the wires 66 and 67 to the pump which is continuously driven.

In the embodiment shown in Fig. 2 the heat exchange unit is provided for the reason that where steam is connected directly to the radiators the more remote radiators may not receive any steam at all; that is, the steam is all condensed in the first part of the system, this particularly being the case where but little steam is used. With the system illustrated the remote radiators are effectively supplied with the heating medium from the heat exchange unit and all of the space is uniformly heated. The control valves permit the adjustment of the temperature for the particular needs of the space. However, the space thermostat should be positioned where it is subjected or exposed to the maximum temperature that is to be maintained.

I have illustrated and described my invention in practical commercial embodiments thereof. I have not attempted to illustrate or describe other adaptations and embodiments which are contemplated as it is believed this disclosure will enable those skilled in the art to embody or adapt the invention as may be desired.

Having thus described my invention what I claim as new and desire to secure by Letters Patent is:

1. In a heating system, the combination with a heat exchange unit and a duct therefrom to the space to be heated, of a thermostat in the space to be heated, said space thermostat comprising a thermal responsive element, electrical contact means operable by said thermal element, electrical contacts operatively associated with said contact means, a thermostat within said duct subject to the fluid discharge from said heat exchange unit, said duct thermostat comprising a thermal responsive element, an electrical contact element operable thereby, and electrical contacts operatively associated with said contact element for engagement one at a time therewith as the thermal element is actuated by temperature variation in the fluid discharged from said heat exchange unit, an oscillatable support for said electrical contacts for alternate adjustment thereof to and from the normal temperature position of said contact element, a reversing motor for actuating said duct thermostat electrical contact support to engage said contacts one at a time with said contact element, said support being automatically operated in a direction to permit disengagement of the engaged contact from said contact element immediately following de-energization of said reversing motor, said support being operable independently of the thermal responsive movements of the duct thermostat thermal responsive element, said motor having electrical connection to the electrical contacts of the space thermostat whereby it is controlled, a valve for controlling the delivery of heating fluid to said heat exchange unit, electrically actuated means for adjusting said valve, and electrical connections from the electrical contacts of said duct thermostat to said valve actuating means.

2. In a heating system, the combination with a heat exchange unit and a duct therefrom to the space to be heated, of a thermostat in the space to be heated comprising a thermal responsive element, electrical contact means operated by said thermal element, electrical contacts operatively associated with said contact means for coaction therewith as the thermal element is actuated upon temperature variations within the space to be heated, a thermostat positioned to be subject to the temperature of the fluid passing through said duct, said duct thermostat including a thermal responsive element, electrical contact means operable thereby, and two spaced electrical contacts positioned for engagement with said contact means, engagement of the contact means with one contact being effected upon flexing of said thermal element in one direction, and engagement with the other contact being effected upon flexing of said thermal element in the opposite direction, movable means for effecting relative movement between said contact means and said contacts for effecting engagement and disengagement between said contact means and said contacts, said engagement and disengagement adapted to be independent of that provided by the flexing of said thermal element, electrical means for operating said movable means to effect engagement between said contact means and one or the other of said contacts, said movable means being automatically operated in a direction to permit disengagement between said contact means and the engaged contact immediately following de-energization of said electrical means, said electrical means having electrical connections to the electrical contacts of said space thermostat, and means for controlling the delivery of heating fluid to said exchange unit operatively associated with said contacts of said duct thermostat.

3. In a heating system, the combination with a heat exchange unit and a duct therefrom to the space to be heated, of a thermostat in the space to be heated comprising a thermal responsive element, electrical contact means operable thereby, and electrical contacts operatively associated with said contact means, a thermostat subject to the fluid discharged from said heat exchange unit and comprising a thermal responsive element, contact means operable thereby, and electrical contacts operatively associated with said contact means, means for adjusting said contacts for effecting engagement and disengagement of the contacts one at a time with said contact means including a reversing motor for effecting said engagement, said contact adjusting means permitting said disengagement immediately following de-energization of said reversing motor, said motor being controlled by said space thermostat, and means for controlling the delivery of heating medium to said heat exchange unit operatively associated with said duct thermostat.

4. In a heating system, the combination with a heat exchange unit and a duct therefrom to the space to be heated, of a thermostat in the space to be heated comprising a thermal responsive element, electrical contact means operable thereby, and electrical contacts operatively associated therewith, a thermostat subject to the fluid discharged from said heat exchange unit, said last named thermostat including a thermal responsive element, electrical contact means operable thereby and electrical contacts to be engaged by said contact means, means for adjusting said last named thermostat contacts controlled by said space thermostat, and means for controlling the delivery of the heating medium to said heat exchange unit controlled by said duct thermostat, said adjusting means including a movable member and electrical means for operating the same, connections from the electrical means to the contacts of the space thermostat, said movable member being supported to occupy a central normal position and to be moved outwardly in opposite directions from said central normal position upon passage of current through said electrical means and to be automatically moved to said central normal position upon stoppage of current through said electrical means, said movable member being operatively associated with the last named thermostat contacts and contact means, to effect engagement between the contact means and one or the other of the contacts upon passage of the current through said electrical means and to permit disengagement of said contact means from the engaged contact upon stoppage of the current through said electrical means.

5. In a space heating system, the combination of a heating medium duct, a space thermostat, a duct thermostat subject to the variations in temperature of the heating medium flowing through said duct, said duct thermostat comprising thermal responsive means, an electrical contact element operated thereby, and an electrical contact to be engaged by said contact element by said thermal responsive means, means for adjusting said duct thermostat for higher or lower temperatures controlled by said space thermostat, said adjusting means including an oscillatable support for effecting relative movement between said contact and said contact element, electric means for operating said support in one direction from a normal fixed position for effecting engagement between said contact and contact element and means whereby said support is operated in the opposite direction back to said position to permit disengagement between said contact and contact element immediately following deenergization of said electric means, and means for controlling the temperature of the heating medium supplied to said duct controlled by said duct thermostat, said controlling means including electric means operable upon engagement of said duct thermostat contact element and contact.

6. In a heating system, the combination of a heating medium duct, a space thermostat for the space supplied by heat from said duct, said thermostat comprising a thermal responsive element, an electrical contact element operable thereby, and electrical contacts operatively associated therewith, said thermostat being provided with means for manual temperature regulating adjustment, means for perodically changing the relationship of said contacts and contact element, a duct thermostat subject to the heating medium carried by said duct, said duct thermostat comprising a thermal responsive means, an electrical contact means operable thereby, electrical contacts engageable by said contact means, a support for said contacts, a rotatable bearing on which said support is loosely mounted and about which said support is adapted to swing from a central normal position, a reversing motor for rotating said bearing, and electrical connections from said motor to the space thermostat electrical contacts, and means for controlling the temperature of heating medium supplied to said duct controlled by said duct thermostat, said controlling means including electrical connections to said duct thermostat electrical contacts.

7. In a space heating system, the combination of a heating medium duct, a space thermostat for the space supplied by heat from said duct, said space thermostat including thermal responsive means, an electrical contact means operable thereby and electrical contacts engageable by said contact means, a duct thermostat subject to the heating medium carried by said duct, said duct thermostat comprising thermal responsive means, an electrical contact operable thereby, electrical contacts engageable by said contact means, a support for said contacts, a rotatable bearing on which said support is loosely mounted and about which said support is adapted to swing from a central normal position, a reversing motor for rotating said bearing, and electrical connections from said motor to the space thermostat electrical contacts, and means for controlling the temperature of heating medium supplied to said duct controlled by said duct thermostat, said controlling means including electrical connections to said duct thermostat electrical contacts.

8. In a space heating system, the combination of a heating medium duct, a space thermostat for the space supplied by heat from said duct, said thermostat comprising a thermal responsive element, an electrical contact element operable thereby, and an electrical contact to be engaged by said contact element, a duct thermostat subject to the heating medium carried by said duct, said duct thermostat comprising a thermal responsive means, an electrical contact element operable thereby, an electrical contact to be engaged by said contact element, a support for effecting relative movement between said contact and contact element for effecting engagement and disengagement thereof, a rotatable bearing upon which said support is loosely mounted and about which said support is adapted to swing to and from a normal fixed position, a motor for rotating said bearing, said motor having electrical connections to be energized upon engagement between said space thermostat electrical contact element and contact, and means for controlling the temperature of heating medium supplied to said duct controlled by said duct thermostat, said controlling means including electrical means operable upon engagement between said duct thermostat electrical contact and contact element.

ADAM E. ARMSTRONG.

REFERENCES CITED

The following references are of record in the file of this patent:

UNITED STATES PATENTS

| Number | Name | Date |
|---|---|---|
| 2,189,381 | McGrath | Feb. 6, 1940 |
| 2,189,382 | McGrath | Feb. 6, 1940 |
| 1,698,989 | Chadwick | Jan. 15, 1929 |
| 2,025,097 | Dougherty | Dec. 24, 1935 |
| 2,160,042 | Taylor | May 30, 1939 |
| 2,272,188 | Danielson | Feb. 10, 1942 |
| 2,151,222 | Millard | Mar. 21, 1939 |
| 2,279,025 | Nelson | Apr. 7, 1942 |
| 2,140,473 | Grant | Dec. 13, 1938 |
| 2,348,497 | Ray | May 9, 1944 |
| 2,257,472 | McGrath | Sept. 30, 1941 |
| 2,246,186 | Prince | June 17, 1941 |
| 1,460,853 | Lacke | July 3, 1923 |